United States Patent [19]

Cook et al.

[11] 3,891,274

[45] June 24, 1975

[54] HOUSING FOR COMBINATION LAP AND SHOULDER BELTS

[75] Inventors: William J. Cook, Rockford; Gordon A. Ellens, Grand Rapids, both of Mich.

[73] Assignee: U.S. Industries, Inc., New York, N.Y.

[22] Filed: Aug. 23, 1973

[21] Appl. No.: 390,888

[52] U.S. Cl. ............. 297/389; 280/150 SB; 297/385
[51] Int. Cl. .............................................. A62b 35/00
[58] Field of Search ......... 297/389, 385; D22/1, 13; 280/150 SB; 244/122.18; 224/42.1 B; 150/52 R; 248/361 A

[56] References Cited
UNITED STATES PATENTS

| | | | |
|---|---|---|---|
| 3,019,287 | 1/1962 | Newcomb et al. | 150/52 R |
| 3,126,228 | 3/1964 | Greene et al. | 297/385 |
| 3,401,980 | 9/1968 | Nicholas | 297/389 |
| 3,436,097 | 4/1969 | Love | 297/385 X |
| 3,437,349 | 4/1969 | Feles et al. | 297/385 X |
| 3,754,775 | 8/1973 | Williams | 280/150 SB |
| 3,811,703 | 5/1974 | Turkovich | 280/150 SB |

*Primary Examiner*—James T. McCall
*Attorney, Agent, or Firm*—Price, Heneveld, Huizenga & Cooper

[57] ABSTRACT

A protective grip and cover for the latch end of a dual lap-shoulder safety belt and method for making the same wherein the grip and cover comprises a generally V-shaped, flexible, resilient, washable, one-piece, molded plastic, tubular body having two tubular, divergent legs extending therefrom which receive and protect a portion of each of the lap and shoulder belts while the body covers and protects the attachment of the belt to the latch plate. The method comprises molding and curing the grip and cover comprising a thermoplastic resinous material in one piece about a mold or substrate having a shape corresponding to the completed cover such that one leg thereof is completely encapsulated. Thereafter, a fluid such as compressed air is directed through the cover into the encapsulated leg to force the cover around the apex of the V-shaped mold and off from the mold.

11 Claims, 12 Drawing Figures

3,891,274

PATENTED JUN 24 1975

SHEET 1

PATENTED JUN 24 1975　　　　　　　　　3,891,274
SHEET 2
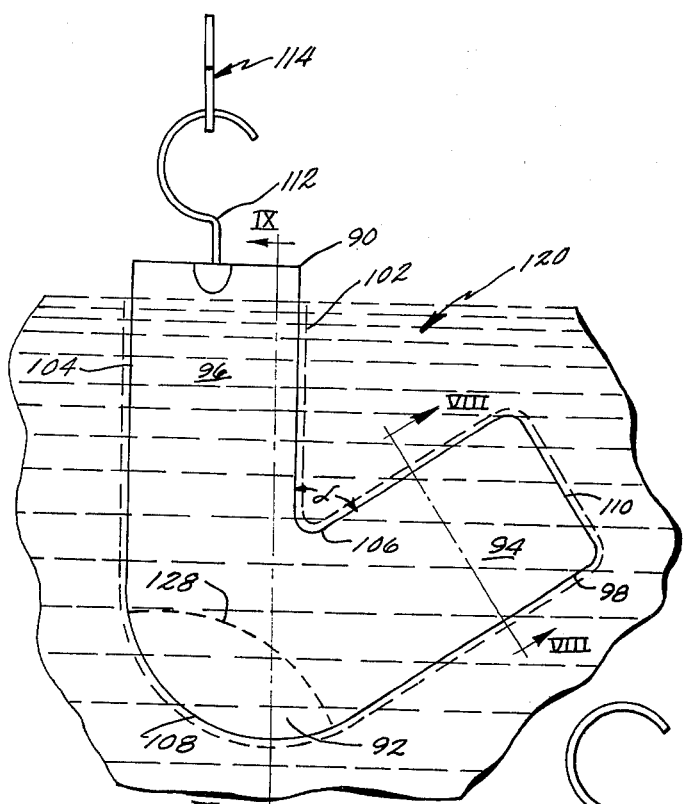
FIG. 7.
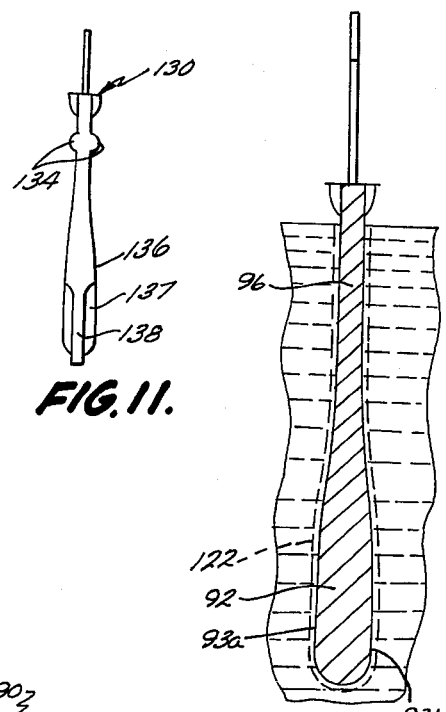
FIG. 11.
FIG. 9.
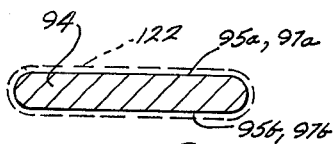
FIG. 8.
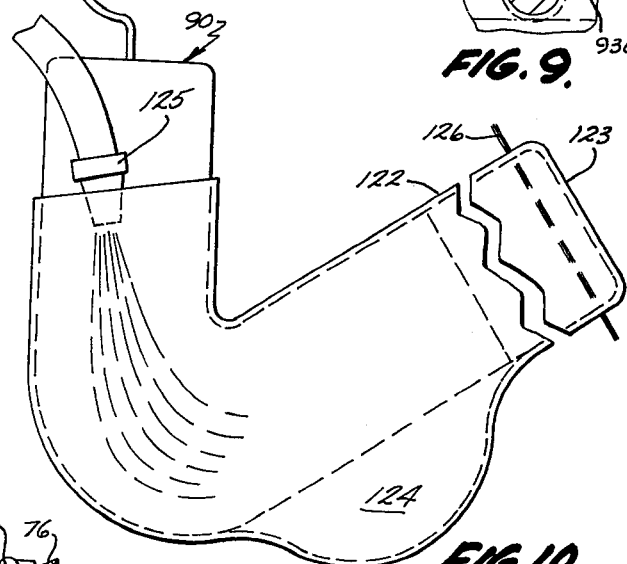
FIG. 10.
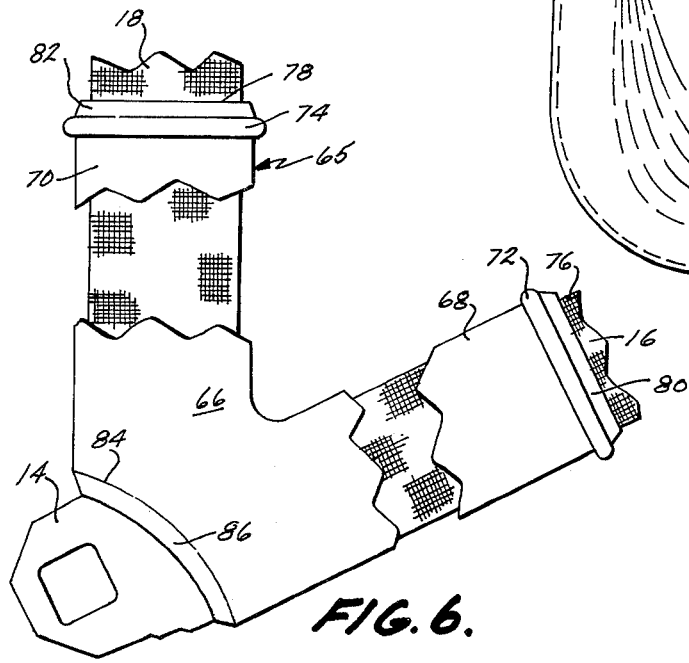
FIG. 6.
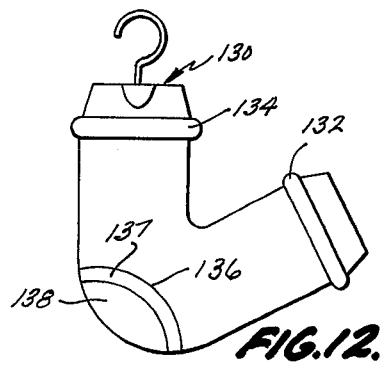
FIG. 12.

HOUSING FOR COMBINATION LAP AND SHOULDER BELTS

This invention relates to protective devices for safety belts and, more particularly, to a housing which serves as both a convenient grip and a protective cover for the latch end of a dual lap-shoulder belt.

BACKGROUND OF THE INVENTION

The protection of safety belts, especially those used in vehicles such as automobiles, has long been a problem. Safety belts for such vehicles are constantly subjected to wear, abrasion, and numerous foreign substances which soil the surfaces of the belts. The problem has been most acute on the latch ends of the safety belts which, depending on the type of belt used, are disposed or located near the floor areas of the vehicle either when in use or when being stored. Accordingly, mud, oil and grease may accumulate on the latch ends of such a belt.

Recently, government standards in the United States and other countries have required the use of both lap and shoulder belts for persons utilizing automobiles. Several types of combination lap and shoulder safety belts have been marketed in which the lap and shoulder belts are individually secured to a single latch plate thereby forming a generally V-shaped arrangement which may be secured to a single latch. This eliminates the necessity of fastening both belts individually. The particular arrangement of these combination or dual lap-shoulder belts has made them more susceptible to the effects of wear, abrasion, and accumulation of dirt and other foreign matter. Their use of two divergent belts fastened at widely separated points to the vehicle and secured in a generally V-shaped arrangement at a single latching location prevents them from being totally retracted into a protective housing for storage as in the case with prior-known individual belts. Accordingly, without such protection when being stored, these combination belts are left unprotected in one position or another adjacent the seat of the vehicle where they may be stepped on, rubbed against soiled articles, or covered with mud, dirt, and the like. Additionally, the soiling of the belts adjacent the latch end is quickened because one or both of the belts adjacent thereto must be grasped to fasten the belts each time they are used. Thus, the belts may be quickly worn or abraded as well as being made dirty such that the efficiency, safety, and desirability of their use is compromised.

Further, the particular arrangement of the combination lap-shoulder belt necessitates their attachment to a latch adjacent the hip area of a person using the belt. In modern cars, the low profile seats position the hip area of a person very near the floor and/or doors of the vehicle. Again, even when they are being used, the location of the combination safety belts, and especially their single latch ends, makes them susceptible to both dirt and wear.

Associated problems with such combination belts include the fact that the attachment areas of both belts to a single latch plate often causes uncomfortable protrusions of belts which both lie against the body of a person using the belt causing discomfort and are more easily worn or abraded. Also, the general V-shape of the attachment of the individual belts to the same latch plate can result in the two belts pinching together when placed under tension, thereby reducing their efficiency and effectiveness.

SUMMARY OF THE INVENTION

Accordingly, it is the purpose of the present invention to provide a protective grip and cover for combination or dual lap-shoulder safety belts which both prevents wear and abrasion of the belt adjacent the point at which the belts are secured to a single latch plate as well as preventing the accumulation of dirt and other foreign matter on the surfaces of the belts. The hollow, tubular grip and cover also provides a convenient and easily cleanable gripping area where the combination belt may be grasped for fastening while at the same time protecting the point of attachment of the individual belts to the common latch plate. In the preferred embodiment, the one-piece cover prevents the two belts from pinching or sliding together when the latch plate has a single securing slot for both belts. The cover is molded integrally in one piece from a flexible, resilient, washable, thermoplastic resinous material such as a vinyl plastic which is easily cleaned or washed, is flexible enough to adjust itself to the contour of the user's body, and is soft enough to prevent wear to the user's clothes. Further, the grip and cover acts as a cushion to increase the comfort for the user by covering and cushioning the protruding materials of the belt where it is attached to the latch plate. The cover is very light in weight and may include decorative designs or surfaces thereon to increase the aesthetic desirability of the cover in a vehicular interior.

These and other objects, advantages, purposes, and features of the invention will become more apparent from a study of the following description taken in conjunction with the drawings.

BRIEF DESCRIPTION OF THE DRAWINGS

FIG. 6 is a broken plan view of the alternative embodiment of the grip and cover shown in FIG. 5 installed on the latch end of a combined lap-shoulder belt;

FIG. 7 is a side view of the molding operation forming a portion of the present method;

FIG. 8 is a sectional view of one leg of the mold or substrate taken along plane VIII—VIII of FIG. 7 including a coating of plastic shown in phantom;

FIG. 9 is a sectional view of one leg of the mold or substrate taken along plane IX—IX of FIG. 7 including a coating of plastic shown in phantom;

FIG. 10 is a side view of a method step subsequent to that shown in FIG. 7 wherein compressed air is used to force the molded product from the mold or substrate;

FIG. 11 is a side view of an alternative mold or substrate used to form the alternative embodiment of the grip and cover shown in FIGS. 5 and 6; and FIG. 12 is a front view of the alternative mold or substrate shown in FIG. 11.

DESCRIPTION OF THE PREFERRED EMBODIMENT

Figure 1:
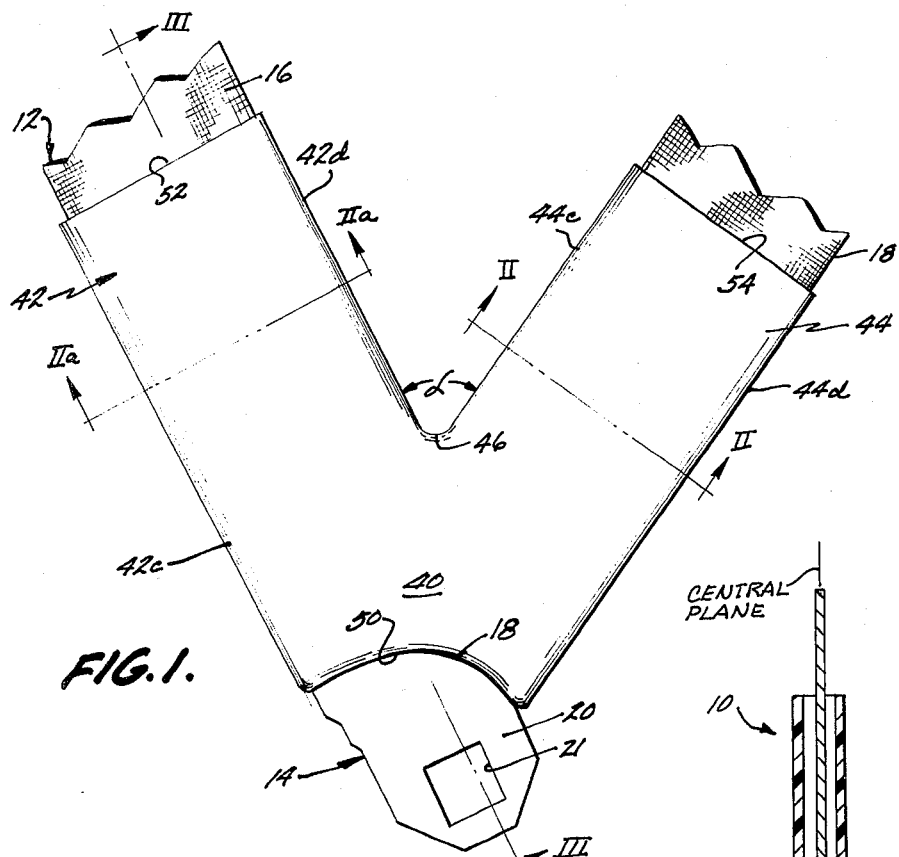
FIG. 1 is a plan view of the grip and cover of the present invention shown installed on the latch end of a dual lap-shoulder safety belt including a common latch plate.
Figure 4:
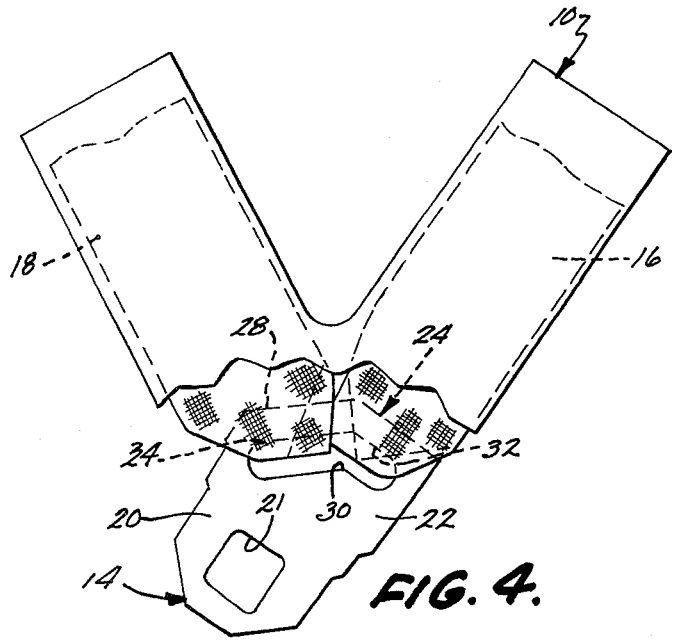
FIG. 4 is a plan view of the common latch plate with the grip and cover and the two lap and shoulder belts extending therefrom shown in phantom.

Referring now to the figures in greater detail, FIG. 1 shows one embodiment 10 of the flexible, resilient grip and cover installed on a combination or dual lap-shoulder safety belt 12 including a common latch plate 14, a lap belt 16 and a shoulder belt 18. The common latch plate 14 includes a tongue portion 20 which may include an aperture or other means 21 enabling the tongue to be secured to an appropriate latching apparatus secured to the floor or other area adjacent the lap of a person using the belt. As shown in FIG. 4, the latch plate 14 also includes a belt-securing portion 22 including a contoured edge 24 having portions 26 and 28 which extend generally normal to the respective lap and shoulder belts 16 and 18. Belt-securing portion 22 also includes a continuous, contoured aperture or slot 30 having portions 32 and 34 generally adjacent to and parallel with the end edges 26 and 28, respectively. However, such an arrangement is not essential to this invention since separate apertures may be provided for each belt.

Figures 3, 5:
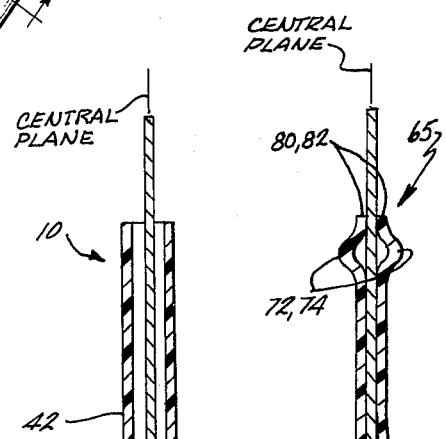
FIG. 3 is a longitudinal sectional view of one of the diverging legs and the body of the grip and cover with the safety belt extending therethrough taken along plane III—III of FIG. 1.
FIG. 5 is a sectional view similar to FIG. 3 but showing an alternative embodiment of the present inventive grip and cover.

As is illustrated in FIGS. 3 and 4, the lap and shoulder belts 16 and 18 are folded and inserted through the respective portions 32 and 34 of aperture 30 after which the free ends of each are sewn to their respective belts. The folding is necessary to allow the belts to be passed through the narrower slots. This results in a double layer of belt (FIG. 3) which also strengthens the belt and resists wear at the point of attachment to latch plate 14. As is seen in FIGS. 1 and 4, the grip and cover 10 of the present invention is designed to fit snugly around the entire attaching or belt-securing portion 22 of the dual lap-shoulder safety belt to protect and cover the same. The cover 10 also extends a predetermined distance along each of the lap and shoulder belts in a direction away from the latch plate 14 to provide protection as well as a convenient gripping area.

Figure 2:
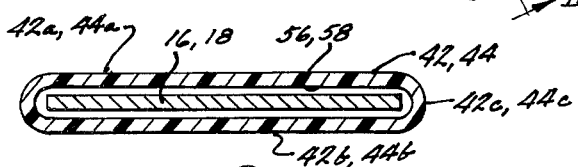
FIG. 2 is a sectional view of either of the divergent, tubular legs with the safety belt extending therethrough taken along either plane II—II or IIa—IIa of FIG. 1.

Referring now to FIGS. 1–3, the first embodiment 10 of the grip and cover includes a tubular body portion 40 or pocket as well as tubular legs 42 and 44 extending from body 40 at a divergent angle represented by "alpha" in FIG. 1. The entire cover is therefor generally V-shaped with body portion 40 forming the apex between legs 42 and 44. Preferably, angle alpha will be less than 90° and will normally fall within the range of approximately 40°–45° for most combination lap-shoulder belts.

Each leg 42 and 44 includes two generally planar, front and back walls forming external surfaces 42a, 42b and 44a, 44b, respectively. These generally planar walls and surfaces are connected to form a complete tube by generally rounded or curved edges 42c and 42d and 44c and 44d. Each of the legs extends from the body or apex portion 40 such that the surfaces 42a and 44a and 42b and 44b are generally coplanar. As is shown in FIG. 3, front and back surfaces 40a and 40b of body or apex portion 40 preferably are formed with a sight outward bulge to provide sufficient room for the double folded belt at the attaching portion 22 of the dual belt 12. Inside rounded edges 42d and 44c form angle alpha and meet at inside corner 46. The body 40 is truncated with outer edges 42c and 44d intersecting arcuate edges 48 which extend into body 40 and define an aperture 50 at the apex thereof. The common latch plate 14 extends through aperture 50 when the cover is installed over the dual lap-shoulder belt. End openings 52 and 54 are provided in legs 42 and 44, respectively, through which the lap and shoulder belts 16 and 18 extend.

As shown in FIGS. 2 and 3, the entire grip and cover 10 has a hollow, tubular construction with the legs 42 and 44 including internal passageways 56 and 58, respectively, while the body or apex portion 40 forms a latch plate receiving pocket 60 formed by the slightly outwardly curved portions 40a and 40b. It will be understood that as is shown in FIG. 1, FIG. 2 represents the cross section of either legs 42 or 44. Each of the internal passageways 56, 58, as well as latch plate receiving pocket 60, is slightly larger than the size of the respective belt and/or latch plate including the belts to facilitate installation of the cover. The grip and cover 10 generally corresponds to and has a similar shape to that of the dual lap-shoulder safety belt 12 and the anchor plate.

Each leg 42 and 44 has a length extending along its respective belt 16 or 18 sufficient to provide between inside corner 46 and the end openings 52 and 54 a grip of such size that the unit may be grasped without the user's hand contacting the belt surface. This further prevents soiling of the belt material which is difficult or impossible to clean. It will be understood that although each of the legs 42 and 44 is shown as being of equal size, that the individual legs may be of different cross-sectional sizes or lengths. Further, the central planes of each leg (extending into the paper in FIG. 3) are generally coplanar. Each leg is symmetrical about this central plane. The traverse dimension across each leg (parallel to the central plane) is a larger multiple of the overall thickness of each leg (normal to the central plane). Accordingly, the general, overall shape of the grip and cover is that of a thin, flat V.

Referring now to FIGS. 5 and 6, an alternative embodiment 65 of the grip and cover is illustrated. Alternative embodiment 65 is generally the same as the first embodiment 10 except for the areas adjacent the apertures through which the lap and shoulder belts 16 and 18 and latch plate 14 extend. In embodiment 65, the grip and cover includes a hollow, tubular body 66 as well as generally coplanar divergently legs 68 and 70 for lap and shoulder belts 16 and 18, respectively. The angle alpha corresponds to the same angle in embodiment 10. However, each leg 68 and 70 includes a rib 72, 74, respectively, each of which is generally hollow and arcuate or curved in cross section and circumscribes the leg generally adjacent end openings 76 and 78, respectively. The end edges 80 and 82 on legs 68 and 70 are offset inwardly toward the belts 16 and 18, respectively, from the edges of ribs 72 and 74. These offset edges form a restricted opening at the end of each leg through which the belts extend. The resulting restricted opening prevents the entry of foreign matter such as dirt and the like into the interior of the cover 65.

Similarly, body portion 66 of embodiment 65 includes similar inturned or inwardly offset lips or edges 84 extending adjacent to and along the curved edge 86 defining the apex aperture 88 through which the latch engaging end of the latch plate 14 extends when the cover 65 is installed on the dual safety belt. The edges 86 also are inwardly offset to restrict the entry of foreign matter.

Each of the grips and covers 10 and 65 is formed integrally, in one piece, from a thermoplastic material preferably including a vinyl resin. One such suitable material is polyvinyl chloride. Such material produces a soft, resilient, flexible and yet memory retaining cover. The material is tough and is highly abrasion resistant. Further, it provides a surface which is easily cleaned and yet may be embossed or otherwise include decorative designs. The softness and flexibility of the material provides a cushion for the belt against the user's body and contours to the shape of the user.

Therefore, in either embodiment 10 or 65, the combination grip and cover of the present invention provides protection against both abrasion and soiling as well as an easily accessible gripping means for the dual safety belt. Should the covers become soiled, their plastic material provides an easily cleaned surface. Further, the soft, pliable, resilient qualities of the covers cushion the points of pressure of the dual safety belt against the body of a person using the belt thereby greatly increasing the comfort of the wearer. This is important because the double folding of the material tends to create hard pressure points against the user.

DESCRIPTION OF THE PREFERRED METHOD

Referring now to FIGS. 7–12, the preferred method for manufacturing the grip and cover 10 for dual safety belts is illustrated. Generally, the method comprises coating a mold or substrate corresponding to the shape of the desired finished product with a suitable, flexible, resilient, thermoplastic material. When the plastic coating is sufficiently cured to have a shape-retaining memory, the coating is stripped from the mold or substrate by air under pressure which utilizes the closed configuration of the plastic coating to effect the stripping of the material.

As shown in FIGS. 7–9, the mold 90 includes a body or apex portion 92 and a pair of coplanar legs 94 and 96 extending at a divergent angle alpha. The front and back surfaces 95a, 95b and 97a, 97b of the legs 94 and 96 are generally flat or planar as shown in FIG. 8. Each of the legs has a substantially greater width than thickness. The generally flat, planar surfaces of each leg 94 and 96 generally blend into the outwardly rounded or curved surfaces 93a, 93b of body or apex portion 92 which, as shown in FIG. 9, has a greater thickness than either of the legs.

The edges 98, 100, 102, and 104 of the legs 94 and 96, respectively, are generally rounded to join the two external generally planar surfaces 95a and 95b and 97a and 97b of the legs as shown in FIG. 8. The inside corner 106 between divergent legs 94 and 96 is generally curved on a small radius between rounded edges 100 and 102 while the apex or outside corner between the two legs has a large radius of curvature defining the rounded apex 108. The end edge 110 of leg 94 is also rounded as are edges 98–104. Additionally, the mold includes a hook 112 or other securing means such that it may be suitably suspended from a suspension means depicted at 114.

Having provided a mold 90 of the above configuration, the mold is next coated with a layer of suitable thermoplastic material preferably containing a vinyl resin to form the grip and cover. In the preferred embodiment, the mold 90 is heated to a temperature sufficient to cause a layer of the thermoplastic material 122 to form around it when it is immersed or dipped in plastic material 120. The length of time it remains in the plastic material determines the thickness of the coating formed on the mold. The immersion of mold 90 results in the plastic material covering the entire mold except for the upper portion of the divergent leg 96, as shown in FIG. 7, including enclosing the end 110 of the other leg 94. Accordingly, the coating 122 includes a closed end 123 on one leg as well as a closed portion 124 around the apex 108 of the mold.

The heating of the mold or substrate 90 and its subsequent immersion in the thermoplastic material follow the prescribed steps and procedures known generally in the industry as dip molding. Such steps and procedures are standard and well-known and may be considered conventional for the purposes of this application. The vinyl resin included in the thermoplastic material preferably is polyvinyl chloride. Such compositions are well-known in the art and typically comprise polyvinyl chloride resins compounded with various plasticizers to create a desired plastisol. Pthalate platicizers are one example of plasticizers which can be used. One such vinyl resin included in a plasticizer forming a plastisol is described in U.S. Pat. No. 3 584 096 issued on June 8, 1971, to Sarkis M. Kassouni and Arthur S. Nicholas entitled METHOD OF MAKING SYNTHETIC SUEDE-LIKE PLASTIC FILMS, which patent is assigned to the same Assignee as this application, the disclosure of which is specifically incorporated by reference herein. This plastisol, when cured, forms a suede-like finish on the layer or coating. The above described vinyl resins included in the plastisol are well suited to the grip and cover because they provide a soft, flexible, resilient, memory-retaining plastic when cured providing a comfortable, contour-adapting combination grip and cover for use on dual safety belts.

Having dipped or immersed the substrate 90 in the vat 120 of the thermoplastic material, the substrate is then withdrawn with the coating 122 of suitable plastic thereon. The coating generally has a thickness in the range of about 1/16 to 3/32 of an inch. Thereafter, the plastic coating is cured to a condition wherein it is sufficiently flexible to withstand stretching and distortion during stripping or removal from the mold or substrate but has sufficient memory to return to its original molded shape following the distortion required for removal from the mold. The time and temperature required to effect necessary curing are well-known to the dip molding art and, therefore, are not detailed here.

Following the curing of the plastic coating 122, to the shape retaining memory condition, the coating is stripped or removed from the mold. Removal is accomplished by forcing a compressed air between the mold 90 and the coating 122 around leg 96 with a suitable nozzle 125 as shown in FIG. 10. The compressed air is forced down the interior of the tubular leg 96, between that leg and the substrate, around the rounded apex 108 and into the other divergent leg of the plastic coating 122 which includes closed end 123. The air separates the molded product from the mold surface, in effect forming an air film between mold and product.

When the air pressure is sufficient within the enclosure, the force of the air against the closed end 123 pulls the flexible coating 122 around the rounded apex corner and over the end 110 of leg 94.

As shown in FIG. 10, the portion of the product formed on the leg 124 of the mold is stretched to pass around the apex of the mold. If the product is cured to the proper stage, the stretched material will return to its original size after removal from the mold. As shown in FIG. 10, the portion 124 of coating 122 molded about the apex 108 retains its shape as it is forced off the substrate 90 by the compressed air.

Following the removal of the cured plastic coating 122 from the mold, the closed end 123 of the product is severed along line 126 to form the opening in that leg through which one of the safety belts will extend when the cover is installed on a dual safety belt. The opening end of the other leg may be trimmed to improve neatness. The arcuate or curved opening in the apex is formed by cutting along a predetermined radius 128 to form the opening through which the latch plate 14 will extend (See FIG. 7).

An alternative embodiment 130 of the mold or substrate is illustrated in FIGS. 11 and 12 for forming the embodiment 65 of the grip and cover shown in FIGS. 5 and 6. Alternative mold 130 is substantially similar in all respects to embodiment 90 except for the inclusion of ridges 132, 134 and shoulder 136 which form the ribs 72, 74 and inturned lips 84 on the embodiment 65 of the grip and cover. Ridges 132 and 134 extend completely around the divergent substrate legs and generally have a semicircular cross-sectional shape. The opening sealing shoulder 136 is formed by a recess in the thickness of the mold in area 138 adjacent the apex of the mold such that the shoulder 136 has an inwardly offset wall 137 and a predetermined curvature or radius as shown in FIG. 12. Accordingly, when a plastic coating is molded or formed about substrate or mold 130, the resulting grip and cover 65 will include the arcuate ribs 72, 74 as well as the inwardly offset edges 80–84 adjacent thereto shown in FIGS. 5 and 6.

Therefore, it will now be understood that the present method comprises a simple, economical process for making a unitary, one-piece grip and cover for dual safety belts which both protects and covers the common latch end of those safety belts. The method allows the production of the unitary element which will not become disassembled from the belts and plate. It may be installed either before or after the belts are secured to the latch plate. If before, the belts are passed through the cover and secured to the latch plate. The belts are then pulled back to seat the latch plate in the apex of the cover. If the belts and plate are already assembled, the belts are introduced through the latch plate opening and pulled through the cover until the plate is sealed in the apex. While two forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or priviledge is claimed are defined as follows:

1. A protective grip and cover for the latch plate of a dual lap-shoulder safety belt comprising a flexible, one-piece, molded plastic tubular body having a tubular first leg and a tubular second leg; said legs being divergent from each other at an angle less than 90°; a latch plate receiving pocket common to both of said legs and forming the apex of said body; the end of said pocket opposite from said legs being open to provide an aperture through which a latch plate may be projected.

2. The protective grip and cover of claim 1 wherein said tubular first and second legs include first and second internal passageways respectively, each of said passageways communicating with said latch plate receiving pocket; each of said passageways in cross section having a width substantially greater than the height thereof.

3. The protective grip and cover of claim 1 wherein said edges of said aperture are offset inwardly to form a restricted opening.

4. The protective grip and cover of claim 3 wherein each of said legs has an open end; the edges of said open ends being offset inwardly to restrict the size of said openings and apertures.

5. The protective grip and cover of claim 4 further including molded ribs adjacent to and paralleling each of said openings, said ribs being arcuate in cross section and extending around said legs and body.

6. The protective grip and cover of claim 1 wherein said body is molded from a flexible, resilient, stretchable, abrasive-resistant, thermoplastic material to provide a washable exterior surface.

7. In combination, a lap belt and a shoulder belt, a latch plate, said latch plate having a tongue portin adapted to engage a latch and a belt-securing portion; a lap belt permanently secured to said latch plate; a shoulder belt permanently secured to said latch plate; said lap and shoulder belts being divergent from each other; a flexible, one-piece, molded plastic combination grip and cover having a pair of tubular legs and a tubular pocket portion; said legs extending away from said pocket portion and forming a V-shaped pattern with said pocket portion at the apex thereof; said lap belt extending through one of said legs and said shoulder belt through the other thereof; the apex of said pocket being truncated to form an opening through which the tongue portion of said latch plate projects; the remainder of said latch plate including the ends of said belts and their attachment to said latch plate; said remainder of said latch plate, the ends of said belts and their attachment to said plate all being enclosed within said cover.

8. The combination of claim 7 wherein each of said legs is of sufficient length that it may be used as a means for grasping said belt and latch plate combination without contact between the operator's hand and said belts.

9. The combination of claim 8 wherein the angle between said divergent legs is less than 90°.

10. The combination of claim 7 wherein the edges defining said opening in the apex of said pocket are recessed into said pocket portion sufficiently to expose enough of said tongue portion of said latch plate to engage a latch.

11. The combination of claim 8 wherein said legs include a common central plane, each of said legs being symmetrical about said common plane and including a width dimension measured parallel to said plane which is a multiple of its thickness measured normal to said plane.

* * * * *